(No Model.) 2 Sheets—Sheet 1.

K. SHIVES.
DEVICE FOR JOINTING CIRCULAR SAWS.

No. 343,203. Patented June 8, 1886.

Witnesses
J. E. G. Armstrong
J. H. Armstrong

Kilgour Shives
Inventor (No Model.) 2 Sheets—Sheet 2.

K. SHIVES.
DEVICE FOR JOINTING CIRCULAR SAWS.

No. 343,203. Patented June 8, 1886.

Witnesses:
Harald Perley

Inventor:
Kilgour Shives
by J. F. Armstrong
Atty

UNITED STATES PATENT OFFICE.

KILGOUR SHIVES, OF DUNSINANE, NEW BRUNSWICK, CANADA.

DEVICE FOR JOINTING CIRCULAR SAWS.

SPECIFICATION forming part of Letters Patent No. 343,203, dated June 8, 1886.

Application filed October 1, 1885. Serial No. 178,732. (No model.)

*To all whom it may concern:*

Be it known that I, KILGOUR SHIVES, a subject of Queen Victoria, in the Dominion of Canada, residing at Dunsinane, in the county of Kings and Province of New Brunswick, Canada, have invented a new and useful Circular-Saw Filing and Truing Machine, of which the following is a specification.

My invention relates to machines for truing the teeth of circular saws as set up for work, and the object of my invention is to provide a simple and inexpensive machine to take the place of hand-work, first, by automatic guides to guide the hand of the sawyer, so that when set for the shortest tooth it will only allow him to file off as much as is necessary to bring the other teeth to the same length, while at the same time the file is made to travel in a direction truly perpendicular to the plane of the saw, and to prevent the file from abrading the guides I incase it in a sheath, which covers the corners, leaving the center of the face or faces open for use, or I may use an equivalent special tool, thus giving smooth surfaces to work on the guides while the cutting-surface is presented to the saw-tooth in the desired direction; and, second, the machine holds and regulates the motion of an abrading-surface against the points of the teeth of the circular saw while in motion, thus bringing all the points into one true circle and making them true transversely. I accomplish this by providing a head with suitable guides with suitable openings to allow the files to play in the desired direction, and also having a socket for receiving the fixed cutter-block. This head is made to travel forward gradually by means of a screw or equivalent device, and the screw or other device being locked and a set being released the head can play backward and forward in the direction of the saw-teeth within certain definite limits.

Figure 1:
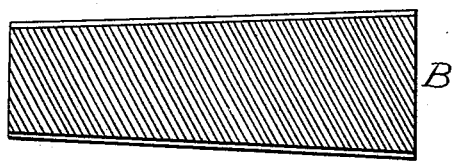
Figure 2:
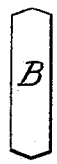
Figure 3:
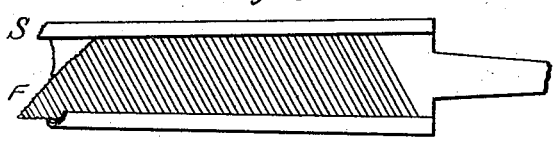
Figure 4:
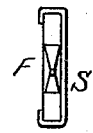
Figure 5:
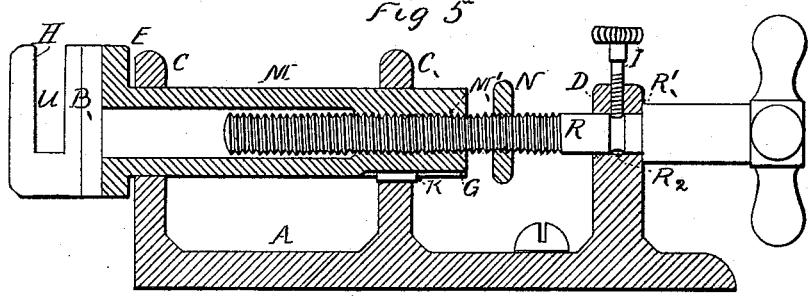
Figure 6:
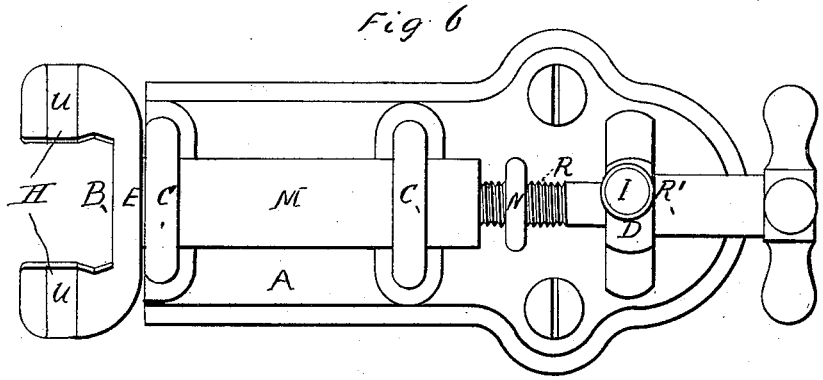
Figure 7:
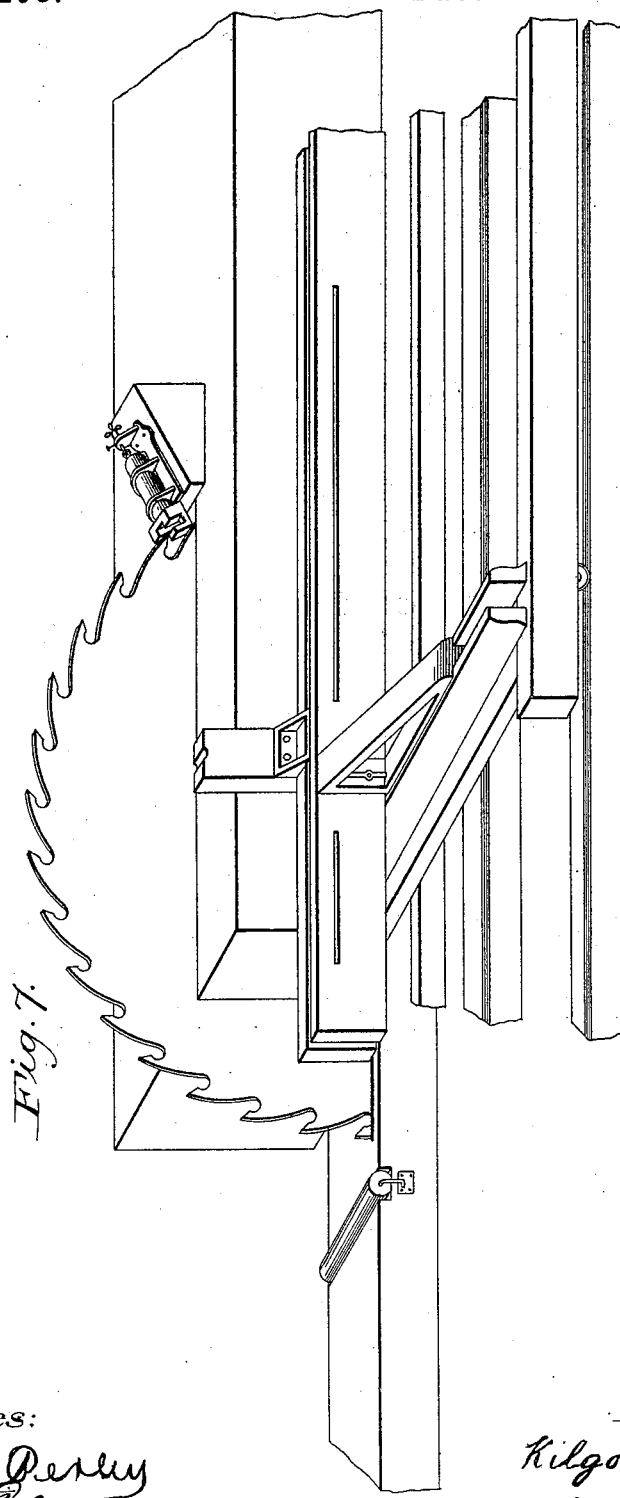

In the drawings, Figure 1 is a front view of the special abrading block or rasp for use in the machine. Fig. 2 is an end view of the same. Fig. 3 is a front view of a file with sheath as an alternative for use in the machine. Fig. 4 is an end view of the same. Fig. 5 is a vertical longitudinal section through the center. Fig. 6 is a plan of the same. Fig. 7 is a perspective showing the machine in position for operating.

A is the frame or body of the machine, having standards C C, supporting the shank M of the head H. A feather or key, K, is made or set in the standard C, which plays in the corresponding keyway, G, and prevents the head and shank from revolving. In the head H is the socket B, tapering and beveled to correspond with the block B. This socket is open toward the front to allow the saw to revolve against the surface of the block B. Also on the head are the W-shaped guides $u$ $u$, on each side of and in front of the socket B. The back of the head forms a shoulder, E, coming in contact with the standard C, and thus limiting the backward motion of the head.

There is another standard, D, at the rear of the machine, supporting a screw-rod, R, which passes forward freely into a hole, D', in the standard until its shoulder R' comes in contact with the standard D. A set-screw, I, passes down in the standard and into the hole D', so that when screwed in its point will project into a corresponding groove, $R^2$, encircling the rod near the shoulder, thus making it possible either to keep the rod from moving at all or to allow it only to revolve, or (the set-screw being withdrawn) to allow it to play in and out. On the rear end of the rod is a convenient handle, which may be used as a gage, by its revolution measuring the motion of the head as driven by the screw. A considerable length of the other end of the rod is threaded to pass through a lock-nut, N, and to work in a female screw, M', in the shank of the head H. There are holes provided in the base of the body for fastening it down in place for use.

In working the machine is fastened down on a seat on a log or the carriage of the mill or other support in proper position in line with and close in front of though clear of the saw, the set-screw being in and the head being retracted to nearly its full extent, the seat being sloped, if required, to bring the filing in the proper direction; or the head H may be attached to the shank M by a joint working in a vertical plane, so that it can be clamped in the desired direction.

Then, first, in using the files, the shortest tooth of the saw being found and the sheathed file being in the guides, the head is pushed forward by turning the screw-rod until the tooth can just touch the face of the file. The lock-nut is then screwed against the end of the shank M, thus locking the rod and head together. The set-screw is then withdrawn, and the head (with parts attached) is free to play backward and forward, but limited by the shoulders E and R', and each tooth in turn can then be filed down till the shoulder R' comes in contact with the standard D.

Second, in using the block B, it is set in the head instead of the file F, and the saw being set in motion the head is pushed forward by turning the screw (the set-screw being in) till the points of the teeth are all trued against the abrading-surface of the block B.

I am aware that prior to my invention saw-jointers have been used having abrading-surface driven against the saw-teeth by a screw. I therefore do not claim such a combination, broadly, but only in combination with my improved saw-filing device; but

What I claim as my invention, and desire to secure by Letters Patent, is—

In circular-saw-filing machines, the combination of the head H, slotted at $u\ u$, fitted for the sheathed file to play in and at B' to admit the saw, and having the internally-screw-threaded shank with a screw-bar, R, having a shoulder, R', and a groove, $R^2$, a set-screw, I, a lock-nut, N, and the frame A, as and for the purpose described.

KILGOUR SHIVES.

Witnesses:
T. E. G. ARMSTRONG,
J. S. ARMSTRONG.